Figure 1:
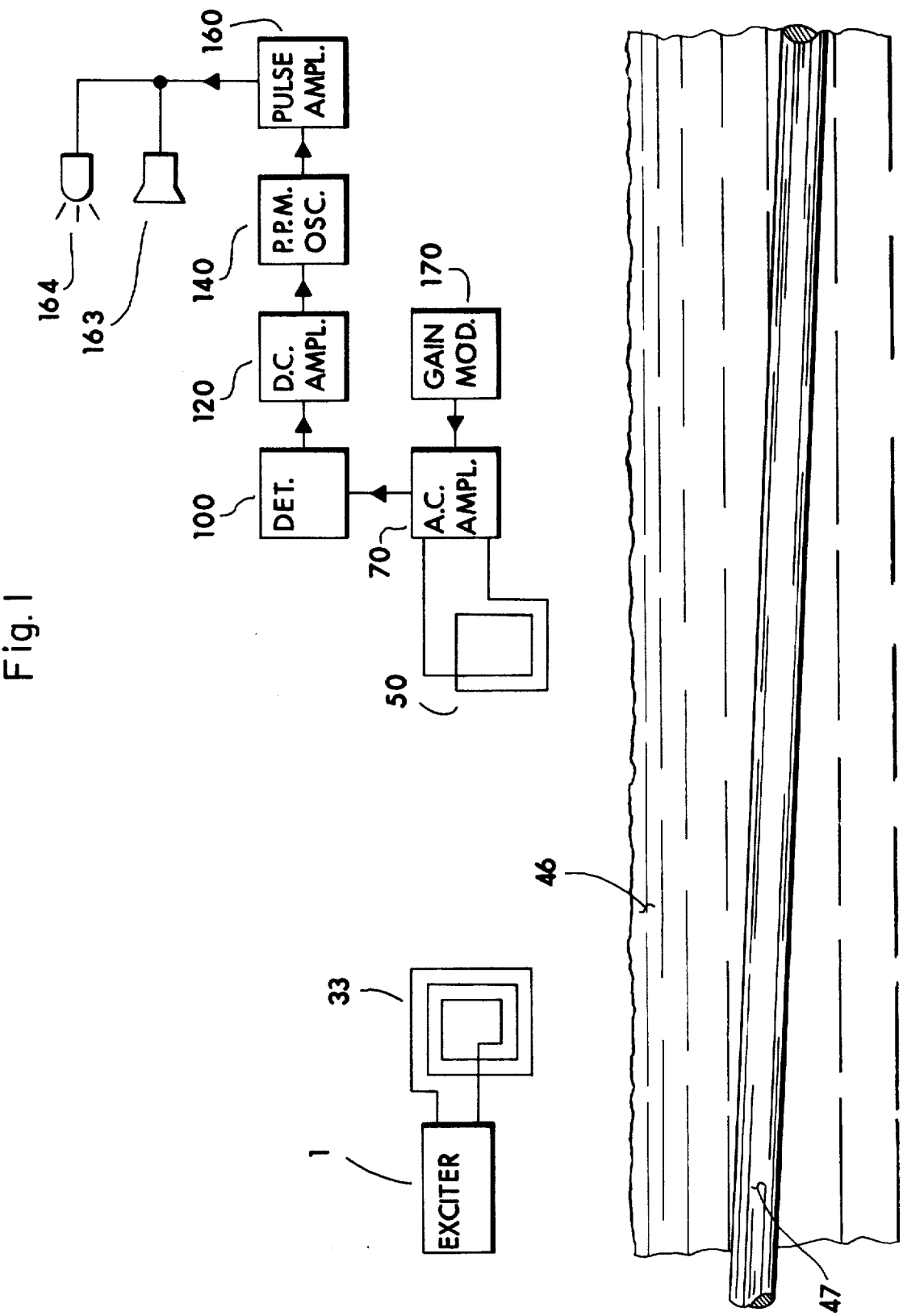

United States Patent [19]

Weber

[11] 4,044,299
[45] Aug. 23, 1977

[54] CONCEALED STRUCTURE LOCATING AND SURVEYING TRANSLATOR APPARATUS

[76] Inventor: Harold James Weber, 20 Whitney Drive, Sherborn, Mass. 01770

[21] Appl. No.: 643,606

[22] Filed: Dec. 22, 1975

[51] Int. Cl.² ............................ G01V 3/08; G01V 3/10
[52] U.S. Cl. ......................................... 324/3; 324/7; 324/67
[58] Field of Search .................... 324/3, 6, 7, 67, 133, 324/52, 72; 340/258 C, 258 D; 325/398, 400, 408

[56] References Cited

U.S. PATENT DOCUMENTS

| | | | |
|---|---|---|---|
| 2,651,021 | 9/1953 | Hays | 324/52 |
| 2,820,959 | 1/1958 | Bell | 324/67 UX |
| 3,309,690 | 3/1967 | Moffitt | 324/67 X |
| 3,418,572 | 12/1968 | Humphreys | 324/67 |
| 3,597,680 | 8/1971 | Haddon | 324/67 |
| 3,617,865 | 11/1971 | Hakata | 324/67 X |
| 3,621,384 | 11/1971 | Yamada | 324/52 |
| 3,889,179 | 6/1975 | Cutler | 324/67 X |

*Primary Examiner*—Gerard R. Strecker

[57] ABSTRACT

My invention relates to improved method and means for a portable concealed structure locating and surveying apparatus, and more particularly, to a portable device which provides separate operating conditions to best initially locate, then subsequently trace or survey a hidden structure or extended object with a minimum of operator interpretive skill. My invention includes an inductive exciter which couples by indirect connection alternating current energy into the structure which is usually obscured in a covert medium. My invention includes also a portable translator which is, in the locating or spotting mode of operation, operating with gain modulation at a slow periodic rate to enable the use of the full, noise limited, gain capablity of the electronic amplification means. I have further conceived a novel way that the noise thus resulting is used as an aid in the initial locating of the indeterminate structure lay. Subsequently after the structure is located, the translator operates in the surveying mode where-in an indication is provided to the operator indicating the relative position of the unexposed structure by audible or visual means.

23 Claims, 9 Drawing Figures

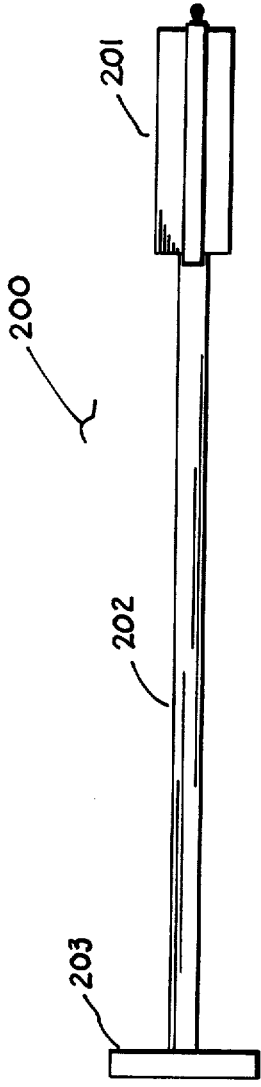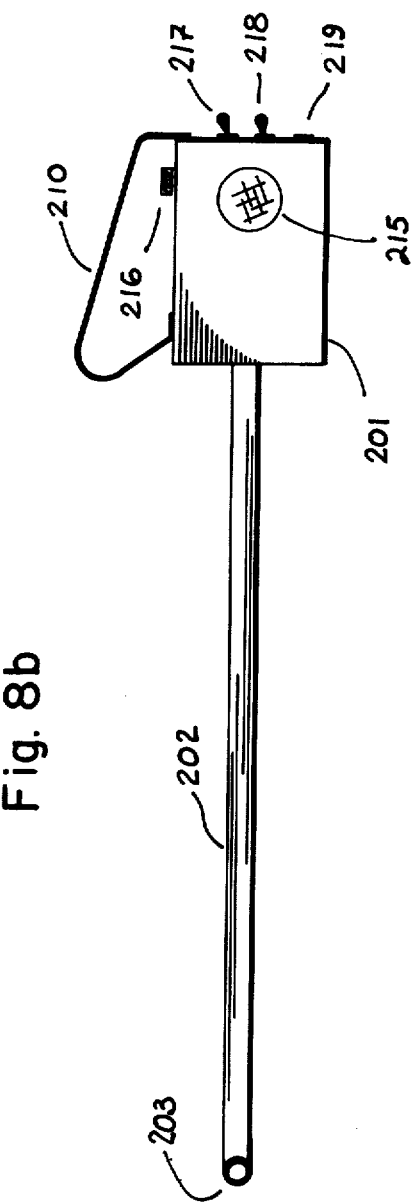

CONCEALED STRUCTURE LOCATING AND SURVEYING TRANSLATOR APPARATUS

SUMMARY OF MY INVENTION

My invention relates to the hookup of electrical and mechanical devices for use in portable concealed object locating and surveying apparatus and more particularly, to a portable device which provides separate operating conditions to best initially spot or locate, then trace or survey a hidden structure with a minimum of operator deftness.

In the field of locating and surveying concealed structures of great expanse in an underground, underwater, or other obscured environment dependence is made upon knowing the approximate lay of the structure. For a practical example, the tracing of city water lines might be the purpose of the survey. Prior art systems would depend upon knowing either the approximate lay of the lines, or alternatively, start their survey at a known juncture such as a hydrant or spigot and work out from that point. My invention improves upon prior art in that for the operation of the translator, no dependence is made upon knowing the lay of the structure to be surveyed. This is a strong and most novel improvement in that, for the case of the previously recited example, it would be most difficult and take great operator skill to differentiate the various lines which could extend from a main hydrant because a great confusion of detectable magnetic field impulses which would be emitted. My invention would, under the same conditions enable a less skilled operator to go to some distance from the hub of the various lines and search for an individual line, and once spotted, to commence surveying said line to its extremity within the range of the apparatus. Very similar kinds of applications for my invention would be for the spotting and surveying of petroleum, gas, chemical and any other of a broad class such applications; for the spotting and surveying of buried cables and wires, such as telecommunications, electrical power, and control networks; and for the locating and tracing of concealed structures such as reinforcements, netting, constructions, and any variety of other man-made or otherwise produced objects.

My invention gives new teachings over prior art in that the translator includes an A.C. amplifier, which may be tuned to a very narrow bandwidth including the possible use of a narrow-band filter because the alternating current signal to be picked up from the exciter is very stable and constant in frequency, the advantage of this narrow bandwidth amplification being that much greater gain can be provided before the amplified noise becomes overwelming.

My invention improves upon prior art in that the rectification or detection method is provided with means to adjust such detection to just the threshold of noise when no strong true signal is being inputed.

My invention is most novel in the use of a modulated degree of gain in the A.C. amplifier circuitry to cause the signal outputing from the A.C. amplifier to vary at a periodic rate from a quiet, low gain value, to that of a noise included signal when the amplification is increased to its maximum level.

My invention teaches the use of methods to integrate and process the noise voltages so developed in conjunction with the true signal input so that a representative D.C. level can be provided which is free of the erratic impulse nature of the raw noise signal. This D.C. signal is then used to drive the repetition period of a narrow pulse generator, such narrow pulses always being much less than 50 percent of the repetition period, a method which is in other equipments known as pulse position modulation. This pulse position modulated signal is current amplified and used to drive any one or combination of sonorant acoustical or visual indicators available to the operator.

REFERENCE TO DRAWINGS.

Figure 2:
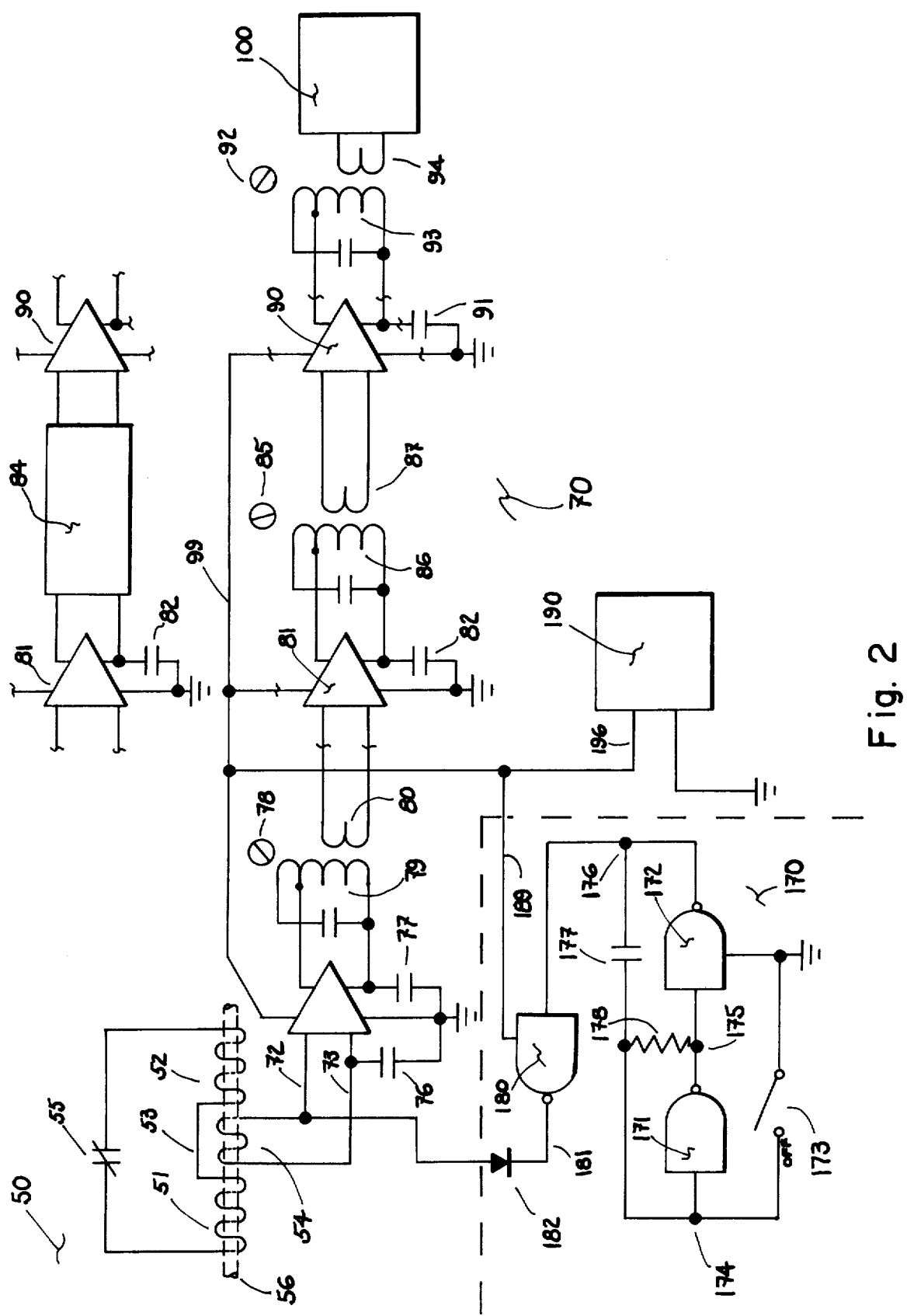
Figure 3:
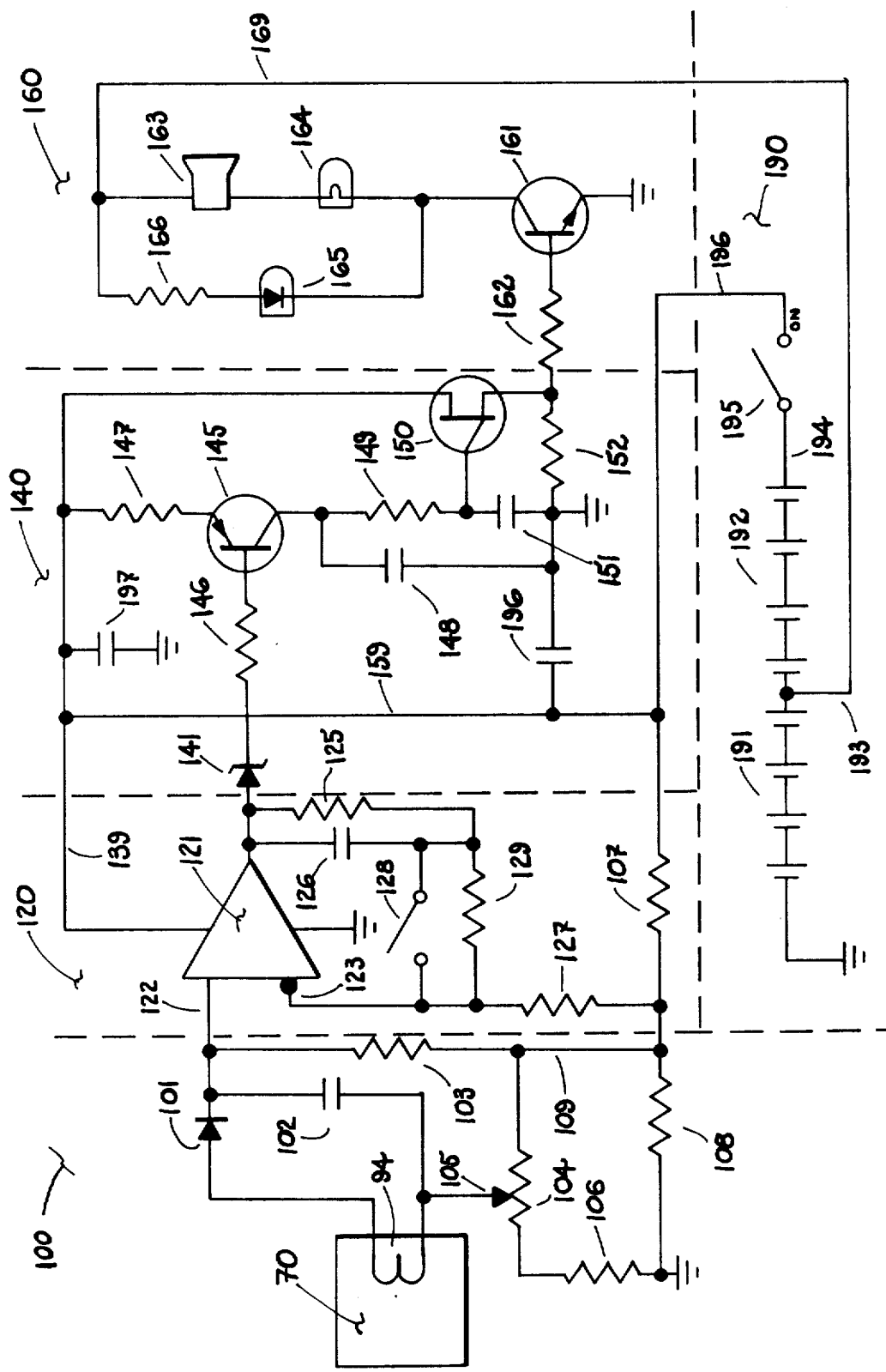
Figure 4:
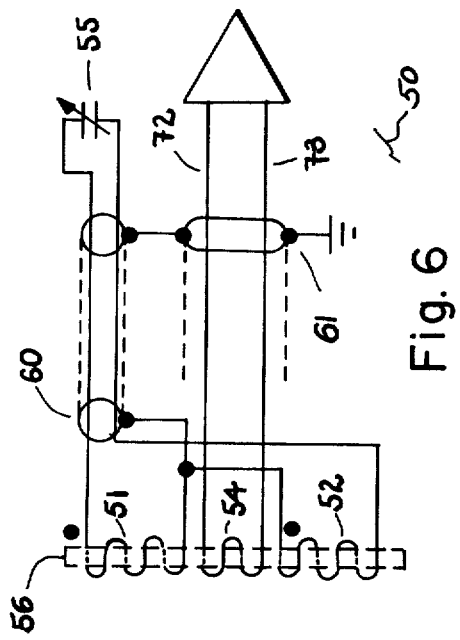
Figure 6:
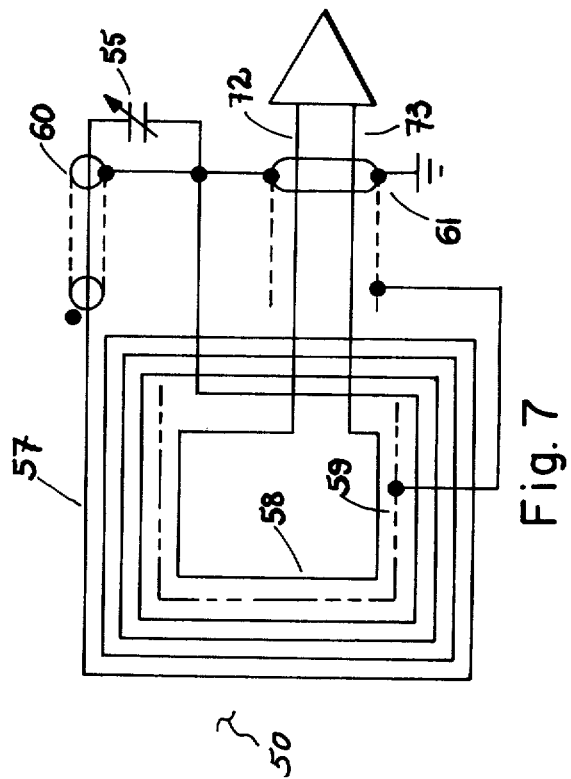
Figure 5:
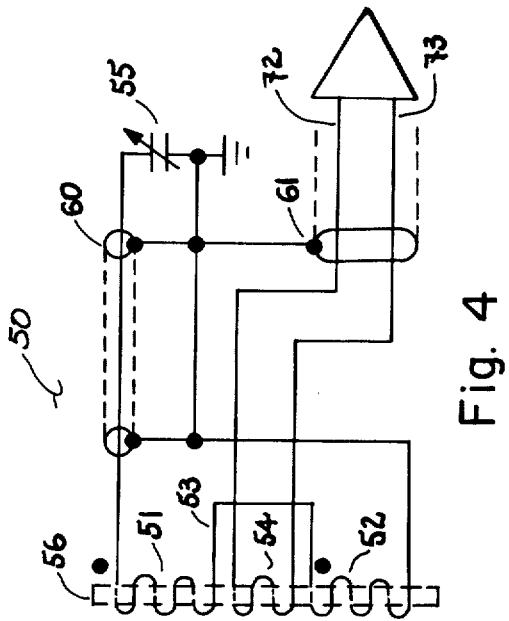
Figure 7:
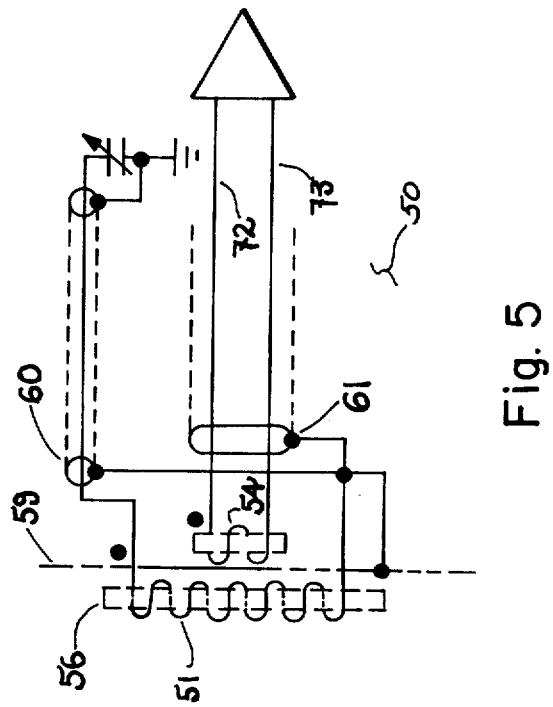

My disclosure includes five sheets of drawings containing eight figures as:

FIG. 1 Shows the overall operating scheme employing my new translator in relation to the hidden structure and the separate electromagnetic exciter, FIG. 2 Shows the schematic diagram for a preferred embodiment of my pickup loop, A.C. amplifier, and modulating means which comprise part of my translator, FIG. 3 Shows the schematic diagram for a preferred embodiment of my threshold detector, D.C. amplifier, pulse position modulated oscillator, and transducer driver means which together with the shown source of D.C. power comprese a part of my translator, FIG. 4 Shows a preferred embodiment of my pickup inducer employing a split resonant winding arranged with symmetry about a central pickup winding, FIG. 5 Shows another embodiment of my pickup inducer employing a singular resonant winding with a centrally positioned pickoff winding so positioned as to find electrical symmetry in relation to the end fields associated with the resonant winding, FIG. 6 Shows yet another embodiment of my pickup inducer with a grounded midpoint resonant winding, FIG. 7 Shows still another embodiment of my pickup inducer employing a large area open loop as a resonant winding together with a pickoff loop, FIG. 8 Shows two views of a preferred embodiment of the form which my translator can take. FIG. 8-a shows a top view which in particular shows the "T" arrangement of the pickup loop opposite the main housing. FIG. 8-b shows a side view which shows the arrangement of the handle, transducer and important controls.

FIG. 1 illustrates the overall methodology employed in my CONCEALED STRUCTURE LOCATING AN SURVEYING APPARATUS. In the preferred embodiment an inductive exciter 1 provides a frequency stable and constant level high frequency alternating current signal to an induction loop 33. The loop is suitably supported over or about the concealment medium 46 which for purpose of clarity is shown as earth, water, or some other moderately insulative substance. Within the soil or substance is located the concealment subject 47 again for purpose of illustration shown as a pipe, cable or other extended structure. By means of the inductive field established by loop 33, some alternating current energy is sympathetically coupled through medium 46 into the more conductive structure 47. This coupled energy is again reradiated along the length and breadth of the structure at a replica rate of the originating inductive signal from the loop 33. The amplitude will be diminished depending upon the distance of suspension within the medium 46, and upon the ratio of relative conductivity of medium 46 as compared to conductive structure 47, where-in structure 47 is always somewhat a better conductor than medium 46. The reradiated field lines emanating from structure 47 throughout its dimensions are subsequently coupled into by a second pickup loop 50 where-in minute currents flow causing the development of substantial signal voltage at the frequency which was developed initially by the exciter 1. The method of coupling high frequency alternating current energy from a source by inductive means into a secondary conductive path which is separated by some insulative medium and subsequently inductively coupling by means of a second loop some of the parasitic energy circulating in the secondary conductive path and thus developing a replica voltage or current is herein described for illustrative purposes to show the medium by which the exciter loop 33 and the translator inducer 50 are coupled. The output of the translator loop 50 is a minute signal which is greatly increased in magnitude by A.C. amplifying means 70. The built-up signal amplitude is rectified by a threshold detector 100 which includes means to adjust the threshold of signal level which may be rectified. The output of the threshold detector is a low level and possibly noisy D.C. level which is further amplified and purified by D.C. amplifier 120. The purified output of the D.C. amplifier serves to control the pulse position or pulse-to-pulse interval of an oscillator 140. The current pulses from oscillator 140 are amplified by pulse current amplifier 160 which in turn excites a sonorant vibrating transducer 163 or other sensory indicating means at a periodic rate which varies principally in accordance with the relative position of loop 50 in relation to structure 47.

When the position of translator loop 50 is uncertain as to its proximity to structure 47, a means is provided for sensitizing the translator assemblage to its maximum capability. This is a major improvement in my disclosure. A gain modulator 170 can be enabled by the operator. The modulator drives the gain of the A.C. amplifier 70 from maximum to near zero at a slow but periodic rate. Through adjustment the operator can reach a point where the noise in the output of amplifier 70 is causing some pulse modulation at the indicator 163. When a signal is encountered, this disturbance or noise voltage rides upon the signal and causes an increased effect on the indicator. Since the modulator 170 is driving between a "no signal" to a "noise signal" condition, when a signal emanating from structure 47 does arrive, the variation between "no signal" and "noise signal plus picked-up signal" will significantly increase assisting the operator in initial location.

After the initial location is accomplished, the gain modulator 170 is disabled. Operation now depends upon the proximity of translator loop 50 to structure 47. As the operator moves about on the structure 47 the signal emanating from the structure and arriving at loop 50 will fluctuate, with the strongest signal generally occuring when the axis of 50 is at right angles to structure 47, with the center of loop 50 directly over the electrical center of structure 47. Some modification of this effect can be introduced by variations in the insulative quality of medium 46, or by secondary structures located in proximity to the primary structure 47.

My TRANSLATOR circuit is shown in FIGS. 2 and 3. FIG. 2 includes the inducer 50, the A.C. amplifier 70, and the repetative gain modulator 170. FIG. 3 includes the threshold detector 100, the D.C. amplifier 120, the pulse position modulated oscillator 140, pulse current driver 160, and the D.C. power source 190. In my embodiment the induction device or directional inducer 50 consists of two coils or windings of wire 51 and 52 wound symmetrically about a third winding 54. Windings 51 and 52 are connected in series by jumper 53. A core 56 of high permeability material, such as powdered iron or ferrite is preferred as an inclusion in the construction of the assemblage including 51, 52 and 54 to enhance the magnetic efficiency of the inducer. Windings 51 and 52 are so chosen as to their value of inductance that resonance at the frequency radiated by the inductive exciter 1, the said frequency in my preferred embodiment being about 440 kilohertz, is obtained when 51 and 52 are paralleled by resonating capacitance 55. In my model the windings 51, 52 and 54 together with core 56 are emplaced in one end of a short staff while resonating capacitance 55 and all the other components which serve to make up the translator embodiment are included in a housing affixed to the opposite end of the staff and so balanced and equipped with a handle that an operator may hold the housing by one hand if so preferred. When suspended in this manner, the natural counterweight balance is such that the operator will find that the end of the staff containing the windings or induction loop droops naturally to the surface upon which the operator is situated. The arrangement then assumes a position which normally places the axis of the core 56 parallel to the surface and perpendicular to the normal direction of motion for the operator. The connections between the windings on one end of the staff and the circuitry housing on the other end of the staff is made by means of electrostatically shielded leads to minimize the effect of stray or parasitic coupling. In my alternative embodiment, windings 51 and 52 are replaced by a large area loop 57. The third winding 54 is replaced by a pickup loop 58 very loosely coupled to 57. Again inducer 57 is brought to resonance by capacitance 55.

The leads from the pickup winding 54 or 58 are run to the input of the selective A.C. amplifier 70. This narrow bandwidth amplifier consists of cascaded gain stages of limited bandpass characteristics. In my conceived method three gain stages were used as shown by 71, 81, and 90. Each gain stage is a transistor amplifier, such as embodied in the monolythic integrated circuit used by me. Junctures 72 and 73 comprise the high and low input connections to the gain device 71. Low input 73 is also bypassed for A.C. to ground by capacitor 76. Junctures 74 and 75 comprise the high and low output connections for device 71. Low output 75 is further A.C. bypassed to ground by capacitor 77. The two outputs 74 and 75 are connected to the input or primary of a resonant coupling device 79, such as a tuned transformer, but not precluding the use of a more selective filtering and coupling means. The resonance of the device is settable by adjustment 78. Winding 80 forms the secondary or output of the said coupling device and makes connection to the inputs of the second gain device 81. In a like manner the outputs of device 81 are coupled through a second resonant coupling device 86 by means of winding 87 and into the inputs of the third gain device 90. Again the resonance of said device 86 can be set by tuning adjustment 85. To be even more preferred in my embodiment and as shown on the inset part of FIG. 2, gain device 81 is coupled through filter 84 into gain device 90. The purpose of filter 84 is to substantially narrow the effective bandwidth of the A.C. amplifier to improve the signal-to-noise ratio and the range of my translator. This is possible because more gain can be used in the A.C. amplifier before the noise becomes overwhelming, therefore this is a very important novel part of my disclosure. Filter 84 is a mechanical transducer type filter of the quartz piezoelectric kind preferred, but with other classes of mechanical transducer filters including mechanical disc resonators and ceramic piezoelectric types finding similiar suitability. The use of filter 84 in my aforedescribed amplifier negates the purpose and need for resonant transformer 86, coupling 87 and adjustment 85 as shown in FIG. 2. To continue, gain stage 90 has its outputs coupled through a third resonant transformer or device 93 which is tunable by adjustment 92. The output of the resonant transformer 94 is connected into the threshold detector 100. Gain stages 81 and 90 have additional A.C. bypass capacitors 82 and 91. A source of D.C. voltage to energize the amplifier stage electrical devices is provided on buss 99.

FIG. 3 shows the threshold detector 100. The signal arriving at the threshold detector has been amplified by the said A.C. amplifier 70. The overall gain of the A.C. amplifier is sufficient that with the induction loop 50 in an electrically quiet environment, some noise will be present at the input of detector 100. The threshold detector 100 in my modeled embodiment consists principally of a rectifying or detecting device 101 and an anti-rectifying bias scheme. My bias scheme consists of a voltage divider consisting of resistor 107 between the D.C. source and the midpoint juncture 109, and with the combination of the series arrangement of potentiometer 104 and resistor 106 in parallel with resistor 108 from juncture 109 to ground. The effect is that the voltage at midpoint 109 is about one-half the available D.C. voltage. With the potentiometer arm 105 most near juncture 109, the D.C. voltage on the anode of rectifier 101 will be the same as that which is on the cathode as supplied through resistor 103. Some of the aforesaid noise arriving from coupling 94 will now be rectified and charge will accumulate in capacitor 102. The result is that juncture 122 will become somewhat more positive that midpoint 109. With a condition of no signal through the A.C. amplifier 70, other than noise, it is now possible to advance the potentiometer 104 so that arm 105 is approaching the end nearest resistor 106. The result is that the voltage now on arm 105 and therefore on the anode of rectifier 101 will be more negative than the positive value at midpoint 109. As is to be expected with a diode type rectifying device, the device becomes blocked or less effective as a rectifier as the anode becomes more negative than the cathode. My first purpose for introducing the reverse or blocking bias is to offset or buck the noise voltage arriving from coupling 94. My second purpose for the reverse bias is to cause the rectifier 101 to be operating in a highly non-linear region the effect of which is to cause a rather rapid increase in rectification efficiency with a modest increase in the signal-plus-noise input voltage from coupling 94.

A D.C. amplifier 120 further amplifies the detected signal. Gain block 120 consists of a transistor gain device 121, preferably an operational amplifier. As is characteristic of the operational amplifier, it has two inputs and one output. Since the input is differential, one input 123 is inverting while the other input 122 is not inverting. This is to say that the signal passing from input 122 to the output 124 will not change sign, while the signal passing from input 123 to the output 124 will reverse its sign. In the quiescent condition with only D.C. voltage on buss 139, the input 122 will be at the potential on juncture 109 via resistor 103. The input 123 will also be at the potential on juncture 109 via resistor 127. The result is that the voltage appearing on output 124 will be very nearly the same as the voltage appearing at juncture 109. As some charge starts to accumulate on capacitor 102 from rectification by 101 of signal or noise, the relative potential on input 122 will become somewhat more positive than the value on input 123 which is still referenced against the fixed potential on juncture 109. The result is that the output 124 will attempt to rise more positive to follow the increase on input 122. The intrinsic gain of a practical operational amplifier 121 is high. This gain is limited by a negative feedback path comprising resistors 125, 127 and 129, together with the associated capacitor 126 and switch 128. When switch 128 is closed so as to shunt resistor 129, the negative feedback limits the gain of amplifier 121 approximately to the value determined by the sum of resistors 125 and 127 divided by resistor 127. When switch 128 is opened the gain increases to a value approximately equal to the sum of resistors 125, 127, and 129 divided by 127. My purpose for being able to change the gain in two or more steps as described is to cause an increase in the maximum sensitivity and thus the distance or range which the translator can be separated from the inductive exciter.

The pulse position modulated oscillator 140 in my model includes a controlled current source consisting principally of transistor 145 and a relaxation pulse oscillator consisting of unijunction transistor 150. The initial circuit conditions are such that with no signal being detected, the voltage at the output 124 of the D.C. amplifier will be about half the voltage on the D.C. power buss 159 and 139. The voltage on output 124 is applied to the anode of an avalanche zener diode 141. The cathode of said zener is terminated to the D.C. voltage buss via resistor 142. The zener voltage of 141 is selected to be somewhat less than one-half the supply voltage. Thus with the output 124 resting at about half voltage, some zener current will flow through resistor 142 causing a voltage drop. The result is that the voltage at the juncture 141, 142 and 146 will be somewhat less than the supply voltage on buss 159. This voltage at said juncture is connected via resistor 146 to the base of PNP transistor 145 with the result that 145 will become forward biased and some collector current will flow. The collector current will subsequently charge capacitor 148 at a constant rate determined by the limiting effect of emitter resistor 147 and the potential difference between buss 159 and the base of transistor 145. This is a very important part of my invention for it is by means of the constant current charging of the bucket capacitor 148 with the strong integrating effect which occurs that more smooth, less noise affected operation of my apparatus can be provided for the operator. The voltage which accumulates on capacitor 148 serves as a source voltage for charging timing capacitor 151 through timing resistor 149. The juncture of the timing components 149 and 151 is connected to the emitter of a class of transistor known as a unijunction. The base one of the unijunction is connected through resistor 152 to ground. Base two is connected to D.C. voltage buss 159. As capacitor 151 is charged expotentially through resistor 149, the emitter voltage of transistor 150 rises towards the base two potential. When the emitter reaches what is described as the "peak point" voltage the emitter becomes forward biased and the dynamic resistance between the emitter and base one drops to a low value. The energy in capacitor 151 then discharges through the emitter, thus through base one and resistor 152 to ground. This discharges most of the energy accumulated in capacitor 151. The rapid discharge of capacitor 151 through resistor 152 causes a positive voltage pulse to occur at the juncture of resistor 152 and base one of transistor 150. Once the capacitor 151 is discharged, recharging will commence and the cycle repeats. This cyclic repetition causes a stream of short duration pulses to occur across resistor 152. The pulses recur at various pulse-to-pulse periods or cyclic rates but with always constant pulse duration or width. The result is a pulse train which is pulse position modulated by the incoming control voltage appearing on line 124.

The pulse current driver 160 consists of a NPN transistor 161, a ballast 164, a visual indicating device 165, and an acoustical transducer 163. The modulated pulse train appearing at the juncture of resistor 152 and base one of transistor 150 is connected via current limiting resistor 162 to the base of transistor 161. This causes the collector current of transistor 161 to follow the pulses arriving at the base. The result is that the modulated pulses will draw current from the D.C. source 169 via the said transducer 163, indicator 165 and ballast 164. The effect of the current pulses on transducer 163 is to cause the sonorant transducer mechanism to vibrate or oscillate. This is a very important feature of my invention in that short period pulses excite the inherent resonance of the transducer and cause acoustical output far in excess of what can be expected if the transducer is driven in a linear manner, for an equivalent amount of power consumption. This provides an important improvement in the efficiency of the apparatus. Since the incoming pulses are of constant width or duration, with their position, spacing or off period modulated, the average power in the pulse train increases in direct proportion to an increase in repetition rate. This change in average power can serve to drive an indicator 165, such as a light emitting diode. This is especially useful when the repetition rate is particularly low for the indicator can be seen to flash. Furthermore, visual indication permits use in areas requiring unusual acoustical quietness and the use of an earmounted transducer would not be suitable. A ballast 164 serves to increase the acoustical output from transducer 163 when the repetition rate is low, while maintaining a reasonable battery current as the repetition rate increases. This is a very significant feature of my invention for the effect is to cause some reduction in acoustical volume as the repetition rate increases, which is consistant with the observation that human hearing is better in the midrange frequencies than at the very low end. Ballast 164 is a positive temperature coefficient device, such as a tungsten lamp bulb filament. When the repetition rate increases the average power increases and the filament heats. This increases its resistance and stabilizes the power through the circuit. Ballast 164 may be an inductive ballast with similiar effect, but with less advantage as to cost and simplicity.

FIG. 2 shows the repetative gain modulator 170. This is one of the most important improvements in my invention and serves to most distinctly make my invention a significant improvement over prior art. In my modeled embodiment, the modulator 170 consists of three gain devices 171, 172 and 180 on a single C-MOS integrated circuit. The gain devices are a particular form described as two-input NAND logic gates. The two inputs are paralleled to effect inverter class operation, which further suggests any gain-block combination offering inverter operation shall be suitable. Devices 171 and 172, in conjunction with capacitor 177 and resistor 178 comprise a particular form of oscillating circuit called an astable multivibrator. A switching 173 device permits the operator to disable the circuit operation at will. When the switch is closed, juncture 174 will be low. The result is that the output of device 171 will be driven high due to inversion. The level thus on line 175 inputs to device 172 and accordingly drives the output of 172 low. The low output thus on juncture 176 inputs to device 180. Accordingly the output of inverter 180 is driven high. The juncture of 181 with switching device 182, such as a diode, causes the diode to become blocked or reverse biased, hence non-conductive. When switching device 173 is opened or non-conductive the gain devices 171 and 172 will remain in the said state until a charge accumulates across 177 via the positive charging current through resistor 178 from juncture 175. When the switching level is reached at input 174, device 171 will change state, with the result that device 172 will also change state. This means that the output 176 of device 172 will be driven high and the input 174 to device 171 will be driven more fully high by the charge transfer through capacitor 177. Juncture 175 will now be low and capacitor 177 will commence to charge in the opposite direction through resistor 178 until again a transistion occurs. The timing of components 177 and 178 are chosen such that the repetion rate or cyclic period is very low, on the order of a few times per second and generally independent from external influences such as incoming signal level through the A.C. amplifier means. As the input of device 180 is now switching the output line 181 will follow. So long as output 181 is high, diode 182 will be blocked and so non-conductive. Therefore the gain of the A.C. amplifier 70 will be normal. When line 181 is driven low, diode 182 will become forward biased and the effect is to shunt the input 72 to ground thus decreasing the gain of amplifier 71 and the overall gain of the A.C. amplifier 70. With the gain thus modulated, and with no true input signal arriving at the inducer 50, the operator adjusts potentiometer 104 until a modulation of the output pulse train from the current driver 160 is just barely discernable on the transducer 163, or as a fluctuation in the visual indicator. This is my most sensitive operating point, as the shift in pitch is representative of hearing or observing noise. Any incoming real signal will now add to this noise and will result in a more pronounced two-tone shift back and forth in pitch from the transducer, or a more pronounced visual indication. Once the structure is located in this manner, switch 173 is closed and gain modulation ceases so the apparatus can be used for accurate surveying. My described embodiment employs two level modulation of gain. The gain can be modulated in any suitable cyclic manner, for example in more than two steps, or in a continuous manner such as sweeping the gain to acheive equivalent performance.

FIGS. 4, 5, 6 and 7 show four different embodiments for accomplishing the necessary symmetry of response and electrostatic isolation necessary in the translator pickup loop 50. Good inductive balance between the pickup loop secondary 54, and the primary resonant windings 51 and 52 is requisite for accurate surveying because the secondary coupling winding has a pronounced loading effect upon the resonant windings and hence if the loading favors one electrical end or the other, it will alter the symmetry of the pickup loop field and cause the effect of the instrument favoring one side or the other of the true center of the concealed structure.

FIG. 4 shows my method where-in two identical windings 51 and 52 are wound in a balanced manner on either side of secondary winding 54 upon a supporting means 56, preferably a high permability material such as ferrite or powdered iron is used for the core to improve the "Q" factor. In this case the two windings 51 and 52 are connected so their inductive fields are series aiding by jumper 53. The remaining two extreme ends leads are then brought to resonating capacitance 55 as described elsewhere in this disclosure. Since resonant windings 51 and 52 are wound physically on either side of secondary 54, electrostatic coupling is kept to a minimum. Extraneous electrostatic coupling via leads 72 and 73 to the translator are likewise shielded 61.

FIG. 5 shows another form of my pickup inducer having the primary winding 51 wound over the full length of the supporting form or core 56. In this version the windings of the primary 51 are increased to be approximately equal to the number of turns combined in the two separate primaries 51 and 52 in the previously cited example for FIG. 4. In FIG. 5, due to the increased number of turns no split primary or resonant winding is needed which can simplify the winding process. The secondary coupling winding 54 is wound upon the center of the resonant winding 51. An electrostatic shield, a Faraday shield, 59 is interposed between the primary 51 and the secondary 54 and returned to ground. The purpose of the shield is to stop the electrostatic coupling which would otherwise exist through the parasitic capacitance between windings 51 and 54. Winding 51 is resonated by capacitance 55. Winding 54 connects to inputs 72 and 73 in the translator A.C. amplifier. The resonant circuit leads are shielded 60. The coupling leads are shielded separately 61.

FIG. 6 depicts still another suitable embodiment to accomplish the necessary balance and minimized stray coupling. Two primary resonant windings 51 and 52 are wound along a core or support 56 and connected at their mid-position to be inductively aiding; or alternatively two separate windings are dispensed with and one full continuous winding with a suitable centertap is provided. In either case the mid-point connection or centertap is earthed or grounded. The two extreme ends of windings 51 and 52 are returned to resonating capacitance 55, both leads being insulated off-ground. Secondary coupling winding 54 is wound about the centertap or juncture point of windings 51 and 52. This is the point of minimum electrostatic pickup between primary and secondary windings since the midtap position is grounded. The coupling winding 54 leads are connected to the inputs 72 and 73 of the A.C. amplifier. The resonant circuit leads are shielded 60 as are the coupling leads 61.

FIG. 7 portrays again another translator inducer. This embodiment employs instead of a solenoid wound resonant primary as cited for FIGS. 4, 5 and 6, a large area open loop somewhat similar to the open loop used with the exciter. The loop 57 is wound as a large open geometric shape: square, rectangular, circular or other such form customary to winding loop antennae. Loop 52 is resonated by capacitance 55 to the operating frequency. The input to the A.C. amplifier 72 and 73 is loosely inductively coupled by a secondary winding or loop 58 to the resonant loop 57 to provide the necessary signal input to the A.C. amplifier. An optional electrostatic shield 59 is shown interleaved between the primary loop 57 and secondary loop 58.

In have found that it is possible to average out the non-uniformity or imbalance of the translator pickup loop induction field lobes by providing for means to initially move the position of the secondary coupling coil 54 axially in relation to the associated primary windings 51 and 52 in the embodiments of FIGS. 4, 5 and 6. Somewhat similar adjustment can be obtained in FIG. 7 by moving the pickup loop 58 in respect to the resonant loop 57. This can be easily accomplished in the case of FIGS. 4, 5 and 6 by manufacturing or placing the windings for the pickup loop 54 on a separate supporting form which can be slid or moved about in relation to windings 51 and 52, and once the optimum relationship is accomplished the secondary winding is permanently affixed by a means such as cement such that the position will not be alterable during normal use or operation.

FIGS. 8-a and 8-b give illustration of my embodiment for the translator makeup. In FIG. 8-a the translator assemblage 200 consists of a housing 201 which contains the bulk of the electrical detail, the operator functions, and a support means 210. A staff or extension means 202 of conveinent length, typically about one meter for a hand carried design, is provided which is constructed so as to be able to support the pickup induction loop housing 203 at its extremity, the housing containing the pickup loop 50 described elsewhere in my disclosure. As shown in FIG. 8-b the support means 210 functions as a handle which is so configured that the natural balance of the weight of the assemblage 200 causes the pickup housing 203 to droop towards the concealment surface during normal operation when a hand grips support 210 at some point along its length. I have found it to be advantageous for support 210 to have room to move the hand fore-and-aft so as to vary the balance and thus cause housing 203 to rest at various declinations. This provides a ready means to accommodate operators of various size.

Housing 201 also supports gain adjustment 216, which includes potentiometer 104 and power switch 195. Sensitivity selector 217 includes switch 128. Search (locate) or Survey selector 218 includes switch 173. Visual indicator 219 includes illumination device 165. Protective grille 215 provides coupling from acoustical transducer 163.

The elements comprising the translator circuit 2 when properly coupled to each other form a compact package which can be principally contained upon a printed circuit board or similar support means within the translator housing 201. My model which operates successfully utilizes the following key components and component values:

| | |
|---|---|
| integrated circuit 71, 81, 90 | μA-703 |
| integrated circuit 1212 | μA-741 |
| integrated circuit 171, 172, 180 | CD4011AE |
| transistor 145 | 2N6076 |
| transistor 150 | 2N4870 |
| transistor 161 | 2N2222 |
| capacitor 76 | 10 nanofarad 25 volt |
| capacitor 77, 82, 91, 126, 197 | 200 nanofarad 16 volt |
| capacitor 55 | 150 picofarad variable |
| induction loop 50 | 1 millihenry |
| transformer 78, 85, 92 | 440 kilohertz |
| rectifier 101 | 1N914 |
| avalanche diode 141 | 1N750 |
| capacitor 102 | 2 nanofarad |
| capacitor 148 | 20 microfarad 15 volt |
| capacitor 151 | 50 nanofarad 16 volt |

-continued

| | |
|---|---|
| capacitor 177 | 470 nanofarad 12 volt |
| capacitor 196 | 20 microfarad 16 volt |
| resistor 106, 147, 162 | 1,800 ohms |
| resistor 103, 107, 142 | 4,700 ohms |
| resistor 108, 149 | 6,800 ohms |
| resistor 127 | 1,000 ohms |
| resistor 125 | 10,000 ohms |
| resistor 129, 146 | 100,000 ohms |
| resistor 152 | 180 ohms |
| resistor 178 | 680,000 ohms |
| potentiometer 104 | 10,000 ohms |
| indicator 164 | Mazda #49 |
| indicator 165 | MV5020 (L.E.D.) |
| transducer 163 | 57 millimeter moving coil excited diaphragm |
| switch diode 182 | 1N914 |
| batteries 191, 192 | 12 volt DC, tapped at 6 volt D.C. |

The foregoing parameters and values are given by way of example only to assist one of average skill in the art to duplicate my invention and are not intended to limit in any way the scope of my invention.

I have hitherto described my invention in terms of a particular form because that form presents most clearly the difficulties my invention improves upon, but it will be understood that my invention is also applicable to other construction.

While my invention has been shown to use particular types of integrated circuit gain and function devices, a person skilled in the art could duplicate the same functions from built up circuits consisting of individual components arranged in a wide variety of combinations. While my translator has shown an A.C. amplifier with three gain stages with resonant interstage coupling transformers, the intent is not to limit the A.C. amplifier to this configuration alone, but to any combination which might be built up by one skilled in the art which has sufficient gain and performance whether it is more or less complex. My invention shows the use of a threshold detector to accomplish a gain function but in no case shall this be construed as the only method, for adjustment of the A.C. amplifier gain, detuning of any or all tuned circuits, decoupling the loop, or any other variation or combination which serves the same end purpose is within the scope of my intent. In my embodiment I show the use of an operational amplifier for D.C. amplification whereas a more simple D.C. amplifier form might be employed. I show a repetative gain modulator circuit which keys or gates the gain of the A.C. amplifier high and low, but this should not discount the possibility of adjusting the gain in steps, in a continuous manner, or by effecting the same result by modulating the threshold detector 100, D.C. amplifier 120, or the efficiency of any of the tuned circuits. While my translator is shown as a portable, hand carried unit this does not construe it to be limited to this configuration alone, but might include a submersible form, or one that is affixed or part of another machine, or that is itself propelled, or that is transported in some other manner.

What I claim is:

1. A translator means for locating a concealed structure which intercepts alternating current electromagnetic field lines reradiating from the concealed structure, where-in the electromagnetic field lines have been introduced into the structure directly or inductively by a separate exciter means and furthermore where-in the structure is a buried or otherwise concealed pipe, cable, or like conductive object, and thereby produces in the said translator a sensory indication of the relative proximity of the said translator to the said concealed structure, including in combination:

a. a directional inducer which produces a minute alternating current voltage from the said electromagnetic field lines re-radiated from the concealed structure;

b. an A.C. amplifier means coupled to said directional inducer which increases the magnitude of the said minute signal voltage;

c. a rectifier means coupled to said A.C. amplifier means, said rectifier means operative to establish the threshold of rectification of the amplified A.C. voltage signal;

d. a modulator means coupled to said A.C. amplifier operative to cause the gain amplification of said A.C. amplifier to be cyclically varied from a point of maximum gain to a point of decreased gain wherein said point of maximum gain is sufficient to produce a significant electronic-noise output from the A.C. amplifier, said variation is gain being at a slow periodic rate independent of the signal being amplified, and furthermore that in the absence of an incoming signal the magnitude of the said cyclical variation causes the output of the A.C. amplifier to vary between a level of high-noise content and lesser noise;

e. a direct current amplifier means coupled to said rectifier which includes means for purifying the D.C. output signal voltage to be free from noise fluctuations arriving from said A.C. amplifier and rectified by said rectifier means;

f. a pulse oscillator means coupled to said D.C. amplifier purified output and being operative to produce pulses essentially constant in duration but with various pulse-to-pulse periods generally proportional to the magnitude of the output voltage from the said D.C. amplifier;

g. a current switch amplifier means coupled to said pulse oscillator means which follows the said pulse oscillator and causes higher magnitude current pulses to be outputed;

h. a sensory indicating means coupled to said current switch amplifier;

i. a source of direct current power including a disconnect means so arranged as to provide operating voltage and current to each of the functional circuit groups comprising the translator.

2. The translator of claim 1 wherein said directional inducer includes two windings which are interconnected to be operative as a resonant winding together with a resonating capacitance, said two windings being electrically divided in a symmetrical manner about a third winding, the purpose for such symetrical electrical winding arrangement being to cause a most uniform inducer interception field and thereby to improve the surveying accuracy of the apparatus.

3. The translator of claim 1 wherein said directional inducer includes the resonant winding wound over the full length of the supporting core form, with said coupling winding positioned thereupon in a manner which is suitable so as to cause the said coupling winding to be electrically symmetrical in the way that said coupling winding loads the said resonant winding, and furthermore whereupon the said coupling winding is provided to be electrostatically shielded from said resonant winding by means chosen to be suitable.

4. The translator of claim 1 wherein said directional inducer includes a resonant winding wound over the full length of the supporting core form, said resonant winding being provided with a centertap connection which is grounded, said resonant winding further including a second coupling winding wound thereupon about the earthed midpoint connection in a manner suitable so as to cause symmetrical electrical loading of the said resonant winding by the said coupling winding, the purpose of said earthed midpoint connection to be to improve the electrostatic isolation of the two windings.

5. The translator of claim 1 wherein said directional inducer includes a large area open wound resonant primary and furthermore wherein said resonant primary includes a secondary winding electrostatically decoupled from the primary winding and with such loose inductive coupling that exists being adjusted to match the input requirements of the subsequent A.C. amplifying means.

6. The translator of claim 1 wherein said directional inducer includes an external electrostatic shield, the purpose of said electrostatic shield being to isolate the effects of extraneous noise electrostatic fields from detracting from the amplifiable quality of the desired external inductive fields.

7. The translator of claim 1 wherein said A.C. amplifier means is improved to be considerably more selective and narrow bandwidth than is customary to enhance the signal to noise performance and enable an improvement in the amount of usable gain, and thus the usable range of the said translator, such advantages associated with decreased bandwidth being made possible by employing a more constant frequency exciter source external to the said translator than what is customary.

8. The translator of claim 1 wherein said A.C. amplifier includes a mechanical transducer type of narrow bandpass filter, said purpose of such filter being to enable the use of more gain in the A.C. amplifier for a given signal-to-noise ratio and thereby extend the range of the translator.

9. The translator of claim 1 wherein said rectifier means includes an anti-rectification bias means which is determinable to establish the minimum A.C. signal which will be rectified.

10. The translator of claim 1 wherein said rectifier means is caused to respond to various minimum A.C. signals induced in the foresaid directional inducer, the method for such determination of rectification threshold to include adjustment of the A.C. amplifier gain, affecting the performance of the resonant circuits, and changing the intercircuit couplings, such means being used jointly as well as separately.

11. The translator of claim 1 wherein said modulator means causes the gain of the said A.C. amplifier means to be varied at a slot periodic rate between a condition of higher and a condition of lower gain, where-in the said condition of higher gain is sufficient to produce a significant electronic-noise output from the A.C. amplifier.

12. The translator of claim 11 wherein said modulator means includes a relaxation oscillator circuit coupled to switching means so as to change the gain of the said A.C. amplifier at a slow periodic rate.

13. The translator of claim 1 wherein said modulator means may be made inoperative, whereupon the gain of the A.C. amplifier rests at a condition of higher gain, insofar as the influences of the said modulator are concerned.

14. The translator of claim 1 wherein said D.C. amplifier means is operative to further purify the D.C. signal derived from the said rectifier means so as to be free from noise fluctuations arriving from said A.C. amplifier coupled to said rectifier.

15. The translator of claim 1 wherein said D.C. amplifier is coupled to a constant current source, said current through said source being determined by the D.C. output level from said D.C. amplifier, the purpose for the said current source being to supply current and charge an intermediate storage capacitor which subsequently supplies the timing charge circuit in a relaxation oscillator to provide smooth pulse position modulation immune from noise disturbance.

16. The translator of claim 1 wherein said pulse oscillator is operative to produce pulses with a constant efficacy but with a pulse to pulse spacing period which is caused to be varied in response to the foresaid purified D.C. signal coupled to the said pulse oscillator from the said D.C. amplifier.

17. The translator of claim 16 wherein said pulse oscillator means includes a current switch amplifier means coupled thereto to increase the current magnitude of the said efficacious pulses.

18. The translator of claim 1 wherein said sensory indicating means includes a resonant acoustical transducer means.

19. The translator of claim 18 wherein the average current through and the emissions from the said acoustical transducer are adjusted by a ballast means, the effect of which is to cause an increase in the peak currents through the said transducer when the pulse to pulse intervals are extended, resulting in an increased acoustical output at the lower repetition rates.

20. The translator of claim 1 wherein said sensory indicating means includes an indicating meter, the purpose of the said meter being to provide a visual indication to the operator.

21. The translator of claim 1 wherein said sensory indicating means includes an illumination device, the purpose being to provide a visual indication to the operator.

22. The translator of claim 1 wherein said translator is contained in a portable housing so constructed as to have the directional inducer supported at the first end of a short staff opposite from the second end which supports the remainder of the apparatus means, said second end including a supporting handle so arranged for balance that by varied placement of the handgrip position the declination of the staff can be caused to be varied effecting a change in the supported height of the first end above the concealment surface.

23. The translator of claim 1 wherein said source of D.C. power consists of a battery group, said battery group to include the optional use of batteries which may be recharged from an external source of prime power.

* * * * *